United States Patent [19]

Negishi et al.

[11] 4,378,917
[45] Apr. 5, 1983

[54] TAPE-END DETECTING DEVICE

[75] Inventors: Tokuji Negishi; Yukio Ito; Satoshi Takagi, all of Toda, Japan

[73] Assignee: Clarion Co., Ltd., Tokyo, Japan

[21] Appl. No.: 204,148

[22] Filed: Nov. 5, 1980

[30] Foreign Application Priority Data

Nov. 12, 1979 [JP] Japan ............................ 54-155830[U]

[51] Int. Cl.³ ........................ B65H 59/38; G03B 1/04
[52] U.S. Cl. ..................................... 242/186; 361/399
[58] Field of Search ............................... 242/186–191, 242/57, 75.47, 36, 37 R; 360/71, 74.1, 74.2–74.4; 235/92 MA, 92 MC, 92 MP, 92 A; 116/67 A, 204; 361/397–399, 415

[56] References Cited

U.S. PATENT DOCUMENTS

| | | | |
|---|---|---|---|
| 3,913,519 | 10/1975 | Sugano | 242/191 X |
| 4,097,726 | 6/1978 | Satoh et al. | 235/92 MP |
| 4,149,027 | 4/1979 | Asher et al. | 361/399 X |
| 4,310,870 | 1/1982 | Kia et al. | 361/415 |

Primary Examiner—Leonard D. Christian
Attorney, Agent, or Firm—Flynn, Thiel, Boutell & Tanis

[57] ABSTRACT

A tape-end detecting device wherein a magnet member fitted to a lower portion of a reel turntable is disposed so as to be spaced from a chassis, a printed circuit board is disposed in the so formed space between the magnet member and the chassis and a magnetic sensing element is fixed to the chassis by the printed circuit board.

2 Claims, 2 Drawing Figures

TAPE-END DETECTING DEVICE

BACKGROUND OF THE INVENTION

1. Field of the Invention

This invention relates to a tape-end detecting device suitable for a cassette-type tape recorder etc., and more particularly to an improvement in the tape-end detecting device which is capable of suppressing wow and flutter for the tape recorder etc.

2. Description of the Prior Art

In general, a tape-end detecting device incorporated in a cassette-type tape recorder etc. is so constructed that it can detect a stop of rotation of a reel turntable when a tape is fully taken up by either of the reels so as to automatically throw, by a detection output, a tape recorder mechanism into a suspended state.

FIG. 1 illustrates one example of a conventional tape-end detecting device. In the figure, a reel turntable 1 rotates clockwise or counterclockwise when a tape runs and the rotation of the reel turntable 1 rotates a magnet member 3 through a belt 2. The magnet member 3 is fixed to a lower face of a pulley 5 rotatably supported by a shaft 4. The magnet member 3 is magnetized circumferentially in N-poles and S-poles alternatingly. A magnetic sensor element 6 is disposed in the vicinity of the magnet member 3 and generates an output which varies according to variations in a magnetic field produced by the magnet member 3 in response to the rotation of the reel turntable 1. Thus, a tape end can be detected.

This conventional device, however, has disadvantages, in that undesirable wow and flutter is increased and a magnetic loss is enlarged due to attraction between a chassis made of an iron plate and the magnet member 3 because they are located in close proximity to each other.

In addition, the belt 2, shaft 4 and the pulley 5 are needed to rotatably support the magnet member 3. Thus, there have been problems in cost and space.

SUMMARY OF THE INVENTION

It is therefore an object of the present invention to provide a tape-end detecting device which is capable of obviating disadvantages involved in the conventional device.

In accordance with the present invention, there is provided a tape-end detecting device for use in a tape recorder, which comprises a magnet member fitted to a lower portion of a reel turntable so as to rotate conjointly with the reel turntable and a means for detecting a variation in a magnetic field caused by the rotation of the magnet member.

DESCRIPTION OF THE PREFERRED EMBODIMENT

Figure 1:
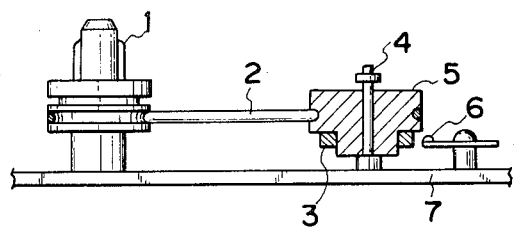
FIG. 1 is a schematic view of a conventional tape-end detecting device.
Figure 2:
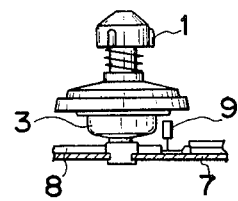
FIG. 2 is a similar schematic view of one form of a tape-detecting device in accordance with the present invention.

Referring now to FIG. 2, there is illustrated one embodiment of the present invention. A magnet member 3 of the present invention is fitted to a lower portion of a reel turntable 1 of a tape recorder without using a separate rotatable supporting means as is needed in the conventional device. In the embodiment illustrated, the magnet member 3 is suitably spaced from a chassis 7 to reduce the attracting action between the chassis 7 and the magnet member 3. To effectively utilize the so formed space between the magnet member 3 and the chassis 7, a printed circuit board 8 is disposed in the space and a magnetic sensing element such as a Hall element 9 is fixed to the chassis 7 at an appropriate location by the printed circuit board 8. The printed circuit board 8 has a detecting circuit etc. for processing an output of the Hall element 9, to which circuit the output of the Hall element 9 is applied.

When a cassette tape (not shown) is loaded onto the reel turntable 1 of the tape recorder and driven for recording etc., the magnet member 3 rotates conjointly with the reel turntable 1. Variations in the magnetic field caused by the rotation of the magnet member 3 are detected by the Hall element 9. When a tape reaches an end, the magnet member 3 ceases to rotate and the output of the Hall element 9 becomes null. Thus, a tape end can be easily detected.

As described above, in accordance with the present invention, undesired wow and flutter can be effectively suppressed and magnetic loss due to closeness between the magnet and the chassis can be markedly reduced. Furthermore, since the magnet member is disposed at the lower portion of the reel turntable, there is no need to provide a pulley etc. Thus, the structure can be simplified very much.

We claim:

1. In a tape-end detecting device for use in a tape recorder, said tape recorder having a chassis and a reel turntable spaced from and supported for rotation with respect to said chassis, which comprises a magnet member supported on a lower portion of said reel turntable so as to rotate conjointly therewith and detector means for detecting variation in a magnetic field caused by rotation of said magnet member, wherein the improvement comprises: a printed circuit board disposed on said chassis, said detector means being fixed to said chassis through said printed circuit board.

2. A device according to claim 1, wherein said detector means is a magnetic sensing element and said printed circuit board has at least a circuit for processing an output of the magnetic sensing element.

* * * * *